United States Patent [19]
Hutka

[11] Patent Number: 5,890,737
[45] Date of Patent: Apr. 6, 1999

[54] POTHOLE PROTECTION MECHANISM FOR A LIFTING DEVICE

[75] Inventor: Otto Hutka, Cambridge, Canada

[73] Assignee: Skyjack, Inc, Ontario, Canada

[21] Appl. No.: 794,263

[22] Filed: Jan. 31, 1997

[51] Int. Cl.⁶ .............................. B60R 21/13; E04G 1/22
[52] U.S. Cl. ...................... 280/755; 280/764.1; 182/141; 187/243; 212/305; 212/196
[58] Field of Search .................... 280/755, 758, 280/763.1, 764.1, 765.1, 766.1; 212/302, 305, 306, 196; 414/673, 719; 182/141; 187/243

[56] References Cited

U.S. PATENT DOCUMENTS

| | | | |
|---|---|---|---|
| 2,408,500 | 10/1946 | West | 212/196 |
| 2,759,563 | 8/1956 | Marnon et al. | 280/755 |
| 4,175,644 | 11/1979 | Sikli | 182/141 |
| 4,401,408 | 8/1983 | Gibert | 280/764.1 |
| 5,439,343 | 8/1995 | Watson | 280/766.1 |
| 5,685,563 | 11/1997 | Ottestad | 280/758 |

OTHER PUBLICATIONS

Skyjack SJII Series . . . the new generation brochure. Jan. 1996.
Skyjack SJM Series. Mini Work Platform. Jan. 1996.

*Primary Examiner*—Peter C. English
*Attorney, Agent, or Firm*—Zarley, McKee, Thomte, Voorhees & Sease

[57] ABSTRACT

A mechanism for preventing tipping of a lifting device having a main frame supported by a plurality of ground engaging support elements and a lifting element raisable and lowerable with respect to the main frame, the mechanism comprising a subframe mounted on the main frame and extending thereunder and intermediately disposed between all of the support members, and a parallel linkage mechanism for raising and lowering the subframe with respect to the ground in response to the lowering and raising of the lifting element respectively.

16 Claims, 5 Drawing Sheets

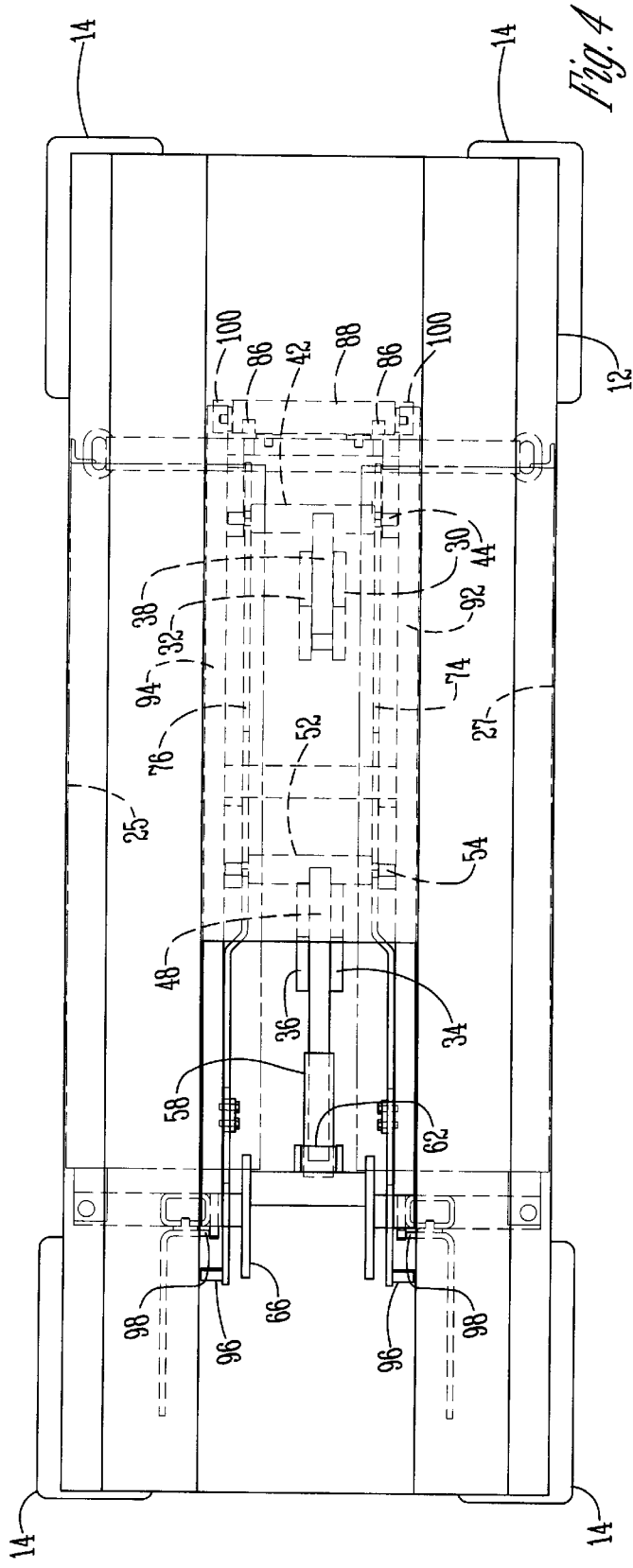

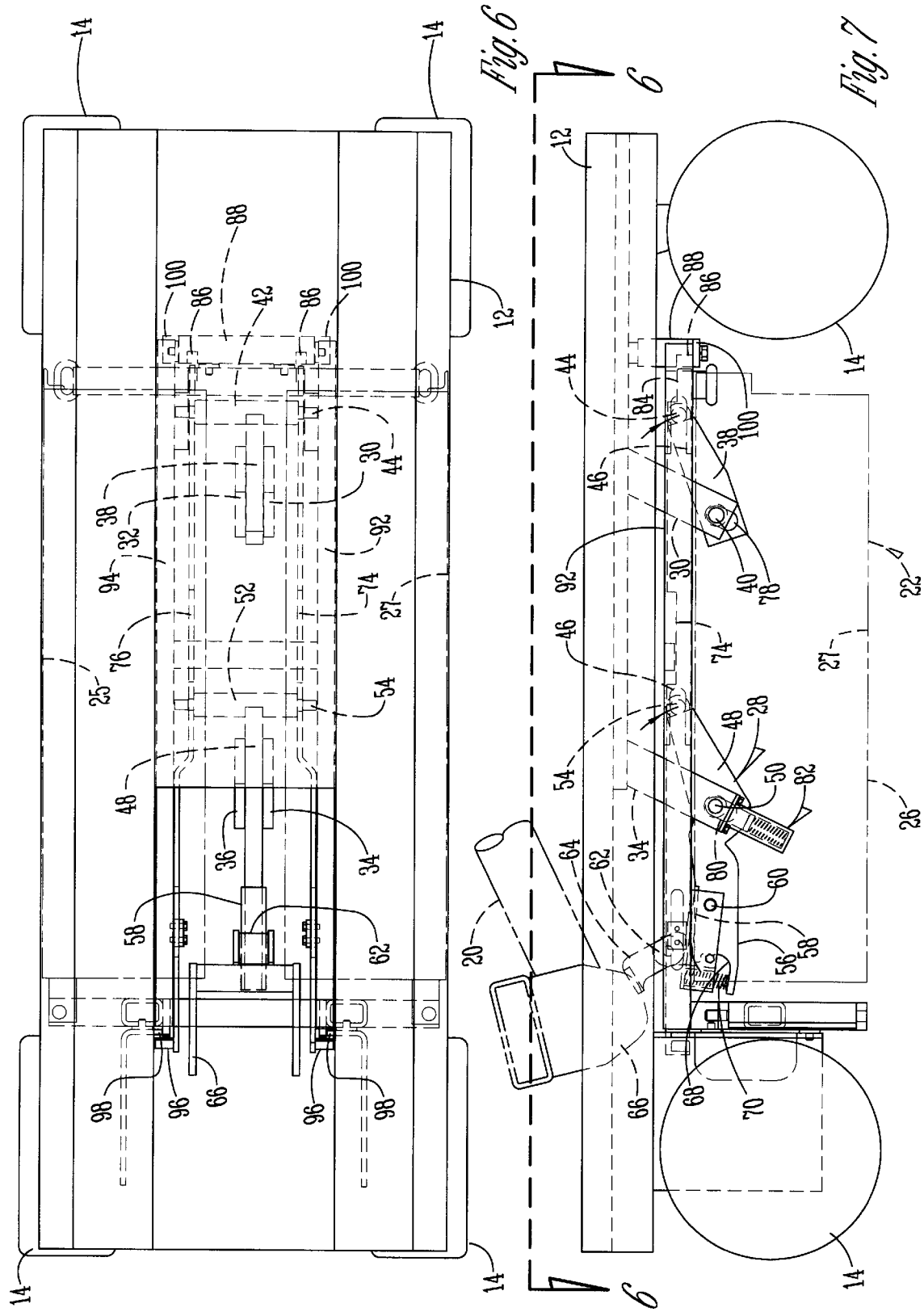

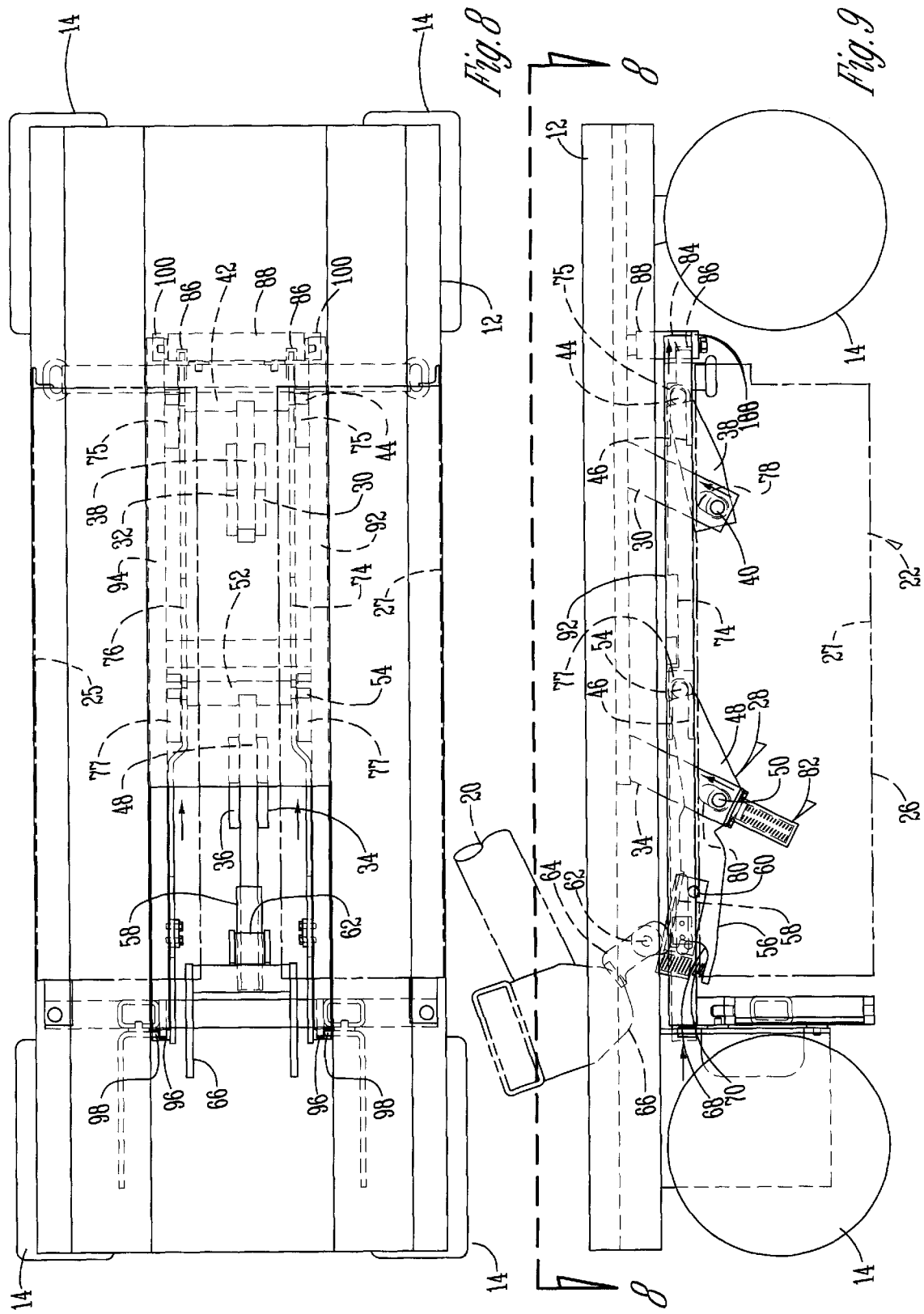

POTHOLE PROTECTION MECHANISM FOR A LIFTING DEVICE

BACKGROUND OF THE INVENTION

1. Field of the Invention

The present invention relates to the field of lifting devices. More particularly, this invention relates to a mechanism for preventing a lifting device from tipping over when a pothole, bump, curb or other support threatening and tip generating hazard is encountered. This invention is extremely useful on a mobile scissor lift which tends to develop an increased potential tipping moment as the lift is raised.

2. Problems in the Art

Various lifting devices have been developed to raise material and/or workers to elevated locations. However, many of these devices are subject to a potential problem which is as old as the ladder itself—they can tip over under certain conditions. Generally, the higher the lifting device reaches, the greater the moment arm and therefore the greater the chances of the machine overturning.

Many modern lifting devices are mobile and some are even self-propelled. While these features enhance the flexibility and usefulness of the lifting devices, the resulting acceleration and deceleration add to the tipping problem. Furthermore, environmental factors including wind and road conditions often contribute to the possibility of tipping. One or more wheels of a mobile lifting device may hit a pothole or run into (or fall off of) a curb, leading to an increased tipping moment. In devices like scissor-style personnel lifts (some of which are also known as MEWP's, mobile elevating work platforms) where the operator is suspended high in the air, tipping can be a serious concern.

Some conventional lifting devices have additional supports, braces, or stabilizing legs which extend diagonally outward from the main frame to contact the ground. However, such braces increase the area consumed by the machine during its operation and decrease machine mobility because the braces generally must be retracted before moving the machine. Furthermore, the feet on the stabilizing legs present a relatively small surface area to the ground for stabilization.

FEATURES OF THE INVENTION

Therefore, a primary object of the present invention is the provision of an improved mechanism for inhibiting tipping in lifting devices.

A further object of the present invention is the provision of an anti-tipping or pothole protection mechanism that yields reduced ground clearance as the lift is raised.

A further object of the present invention is the provision of a mechanism that provides pothole protection without substantially increasing the ground space the lifting device occupies during use.

A further object of the present invention is the provision of a pothole protection mechanism which is simple in construction, durable in use, reliable, and economical to manufacture.

These and other objects will be apparent from the drawings, and also the description and claims which follow.

SUMMARY OF THE INVENTION

The present invention relates to a mechanism for preventing tipping of a lifting device having a main frame supported by a plurality of ground engaging support members. The lifting device includes a lift element raisable and lowerable with respect to the main frame. The mechanism comprises a subframe mounted on the main frame and extending thereunder between the support members. The subframe is raisable and lowerable with respect to the ground in response to the lowering and raising of the lifting element. To accomplish this variation in ground clearance the subframe may be raised and lowered with respect to the frame or, alternatively, the support elements (wheels) can be extended or retracted with respect to the main frame. The result is the same, the ground clearance is varied in response to the raising and lowering of the platform. The lower ground clearance decreases the likelihood of the lifting device being upset.

A lock mechanism can also be provided to lock the subframe in a lowered position. In one embodiment, the lock mechanism comprises a pair of laterally spaced stop rails mechanically coupled with the pothole protection mechanism. The stop rails engage notches on a stop bar mounted to the main frame.

BRIEF DESCRIPTION OF THE DRAWINGS

FIG. 4 is a top plan view of the lower portion of the scissor lift taken along line 4—4 in FIG. 5. The scissor lift is in the lowered position.

FIG. 5 is a side elevation view of the lower portion of the scissor lift of FIG. 4.

FIG. 6 is a top plan view of the lower portion of the scissor lift taken along line 6—6 in FIG. 7.

FIG. 7 is a side elevation view of the lower portion of the raised scissor lift of FIG. 6, which shows the raising and lowering means for the subframe. The subframe is in a lowered position.

FIG. 8 is a top view taken along line 8—8 in FIG. 9 of the lower portion of the raised scissor lift, similar to FIG. 6, but shows the subframe in a lowered, stopped and locked position.

FIG. 9 is a side elevation view based upon FIG. 8.

DETAILED DESCRIPTION OF THE PREFERRED EMBODIMENT

Figure 1:
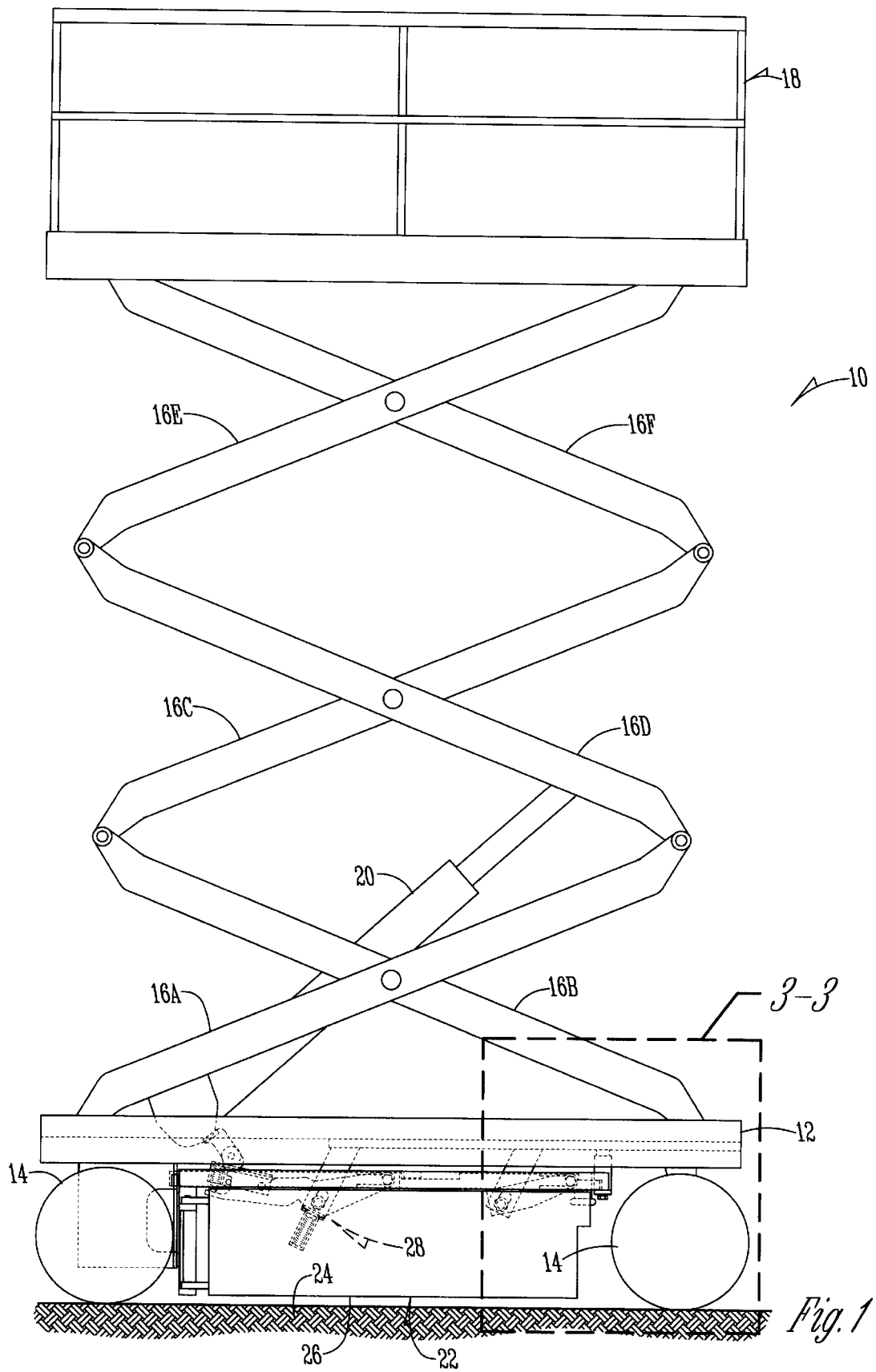
FIG. 1 is a side elevation view of a scissor lift in a raised position and equipped with the present invention. The subframe is in a lowered position.

A lifting device 10 is shown in FIG. 1. Although the present invention is applicable to other types of lifting devices, a mobile elevating work platform (MEWP) is shown for purposes of illustration. The lifting device 10 includes a main frame 12 supported by a plurality of support members 14 mounted thereon. Of course, when the support members 14 are wheels, the device 10 has a great deal of mobility. A plurality of scissor members 16A–16F are arranged in a conventional criss-crossing manner to elevate and support a work platform 18. A lifting element 20, here shown as a hydraulic cylinder, has one end pivotally attached to the main frame 12 and another end pivotally attached to a scissor member, such as member 16D. The hydraulic cylinder 20 raises and lowers the platform 18.

The above-described structure is conventional and typical of most mobile elevating work platforms, however, the present invention lies in the use of a mechanism, which is described in greater detail below, for effectively raising and lowering a subframe 22 with respect to the ground 24 or other suitable supporting surface. The subframe 22 is interposed between the wheels 14 in a horizontal plane and the main frame 12 and the ground 24 in a vertical plane. Preferably, the subframe 22 carries two large, generally rectangular sheet metal boxes or trays which define a planar bottom wall 26 having a substantial area. The trays 25, 27 are utilized for storing the hydraulic tanks, batteries, and other heavy components of the lifting device 10. It is contemplated that the trays 25, 27 could be swingably or slidably mounted to the subframe 22 for easy removal of the contents.

FIGS. 4–9 provide additional detail on the means for raising and lowering the subframe 22 with respect to the ground 24 due to the movement of the platform 18. In FIGS. 4–9, the subframe 22 is mounted to the main frame 12 by parallel linkage means 28 so the subframe 22 is held level and moves evenly.

The parallel linkage means 28 comprises two pairs of laterally spaced parallel brackets 30, 32; 34, 36. Each of the brackets 30, 32 have one end rigidly attached to the main frame 12 and another end extending downwardly and forwardly therefrom. A similar pair of brackets 34, 36 extends from the main frame 12 farther forward on the lifting device 10.

A first arm 38 has one end interposed between the brackets 30, 32 and pivotally connected thereto by a pin 40. The other end of the first arm 38 is rigidly attached by welding or other suitable means to a hollow shaft 42 which journals a pivot shaft 44 extending therethrough. The respective ends of the pivot shaft engage a mounting cavity 46, preferably a slot, in either side of the subframe infrastructure.

Moving forward to the brackets 34, 36, a second arm 48 is interposed therebetween and pivotally connected thereto by a pin 50. Similar to the arrangement described with respect to the rear pair of brackets 30, 32, one end of the arm 48 is rigidly attached to a hollow shaft 52 which journals a pivot shaft 54 extending therethrough into the mounting cavity or slot 46 in either side of the subframe infrastructure.

Furthermore, the arm 48 comprises a lever arm portion 56 which extends forwardly of the pin 50. The forward end of the lever arm 56 has a spring-loaded contact and dampening plate 58 pivotally mounted thereon by pin 60. The contact and dampening plate 58 is preferably formed of a piece of generally U-shaped angle iron. The plate 58 includes a contact surface which is substantially horizontally disposed. The contact surface has sufficient width to insure solid and stable contact with a horizontally disposed roller wheel 62 that is rotatably mounted on the lower end of an actuator arm 64. The upper end of the actuator arm 64 is rigidly attached to a pivot saddle 66, which pivotally mounts the lower end of the hydraulic cylinder 20 to the main frame 12. The forward end of the lever arm 56 has a D-shaped opening 68, wherein a spring 70 is operatively interposed between the lever arm 56 and the underside of the contact and dampening plate 58. In addition to dampening any shock loads, which might occur as the roller wheel 62 engages the contact plate 58, the spring 70 urges the contact plate 58 into engagement with the roller wheel 62.

Referring to FIGS. 4–7, the above-described arrangement allows the subframe 22 to be lowered or raised in response to the raising or lowering of the hydraulic cyclinder 20 respectively. FIGS. 4 and 5 illustrate the position of the pothole protection mechanism when the work platform is completely lowered. The lifting element 20 has been lowered, which causes the top of the saddle member 66 to rotate clockwise to a substantially horizontal position. The actuator arm 64 attached to the saddle member 66 moves downward in response. Thus, with the work platform 18 lowered, the subframe 22 is raised to its highest position. The roller 62 of the actuator arm 64 strikes the contact plate 58 and pivots the lever arm 56, which raises the subframe 22 with the parallel linkage means 28.

As the work platform is raised, the lifting element 20 and the saddle member 66 pivot in a counterclockwise direction. Therefore, the actuator arm 64 pivots as well and gradually reduces the downward pressure on the lever arm 56. As a result, gravity brings the subframe 22 down toward the ground, as best seen in FIG. 7.

It will be appreciated that the raising and lowering of the subframe 22 in response to the lowering and raising of the work platform 18 takes place mechanically in the preferred embodiment. However, hydraulic and electronic means could also be used to achieve the desired responsiveness. For instance, it is contemplated that limit switches and hydraulic cylinders could be used to move the subframe 22 vertically.

Although the lowering of the subframe 22 has the added benefit of lowering the center of gravity of the vehicle, the primary benefit is greater anti-tipping protection against potholes. Pothole protection is achieved when the anti-tipping subframe 22 is lowered so the bottom wall 26 contacts or drags on the ground when a significant pothole or drop-off is encountered. The lifting device 10 is thereby physically inhibited from tipping. To achieve this benefit, a lock mechanism is necessary to hold the subframe 22 in a lowered position.

A locking mechanism is best seen in FIGS. 8 and 9. A pair of stop rails 74, 76 extends longitudinally along the top of the infrastructure of the subframe 22. Slide blocks 75, 77 are mounted on the subframe 22 rearward of the brackets 30, 32 and 34, 36 respectively. Each slide block 75, 77 includes a generally horizontal slot 46 therein which opens forwardly and is adapted to slidingly receive a pivot shaft 44 or 54.

Slots 78, 80 in the arms 38, 48 respectively, extend upwardly at approximately the same angle as the brackets 30–36. A spring mechanism 82 is operatively interposed between the brackets 34, 36 and the pivot arm 48. When the subframe 22 nears its lowest point of extension, the spring mechanism 82 urges the pivot arm 48 and the pin therethrough upwardly in the slot 80. This causes the pivot arm 48, and thereby the pivot arm 38, to move rearwardly in the slots 46.

Stop rails 74, 76 are connected to the ends of the pivot shafts 44, 54. Thus, the stop rails 74, 76 slide rearwardly along with the pivot shafts 44, 54. The rear ends of the stop rails 74, 76 have legs 84 extending therefrom. When the stop rails 74, 76 are urged rearwardly, the legs 84 extend into notches 86 on a stop bar 88 mounted to the frame 12. Insertion of the legs 84 into the notches 86 prevents any further vertical movement of the subframe 22 and locks it into place at that end.

On the other end of the stop rails 74, 76, stop tabs 96 extend transversely. The movement of the stop rails 74, 76 draws the tabs 96 under a pair of stop arms 98 rigidly mounted to the main frame. Thus, the subframe is locked against vertical movement, particularly upward movement, on four corners.

When the platform 18 is lowered, the actuator arm 64 again puts pressure on the forward end of the pivot arm 48, which overcomes the upward force of the spring mechanism 82 and moves the pivot shafts 44, 54 rearwardly. The pivot shafts 44, 54 carry the stop rails 74, 76 with them and the legs 84 retract from the notches 86. Thus, the subframe 22 can be freely raised.

Other types of locking mechanisms are contemplated and could be used without detracting from this invention. For instance, the locking mechanism can be hydraulically operated. When the subframe contacts a limit switch (indicating that the desired position has been reached), a solenoid can cause a hydraulic cylinder to extend its rod or extension thereof into a notch. Alternatively, a hydraulic locking mechanism can be placed in the same hydraulic circuit with the lifting element or cylinder 20 so that the hydraulic cylinder in the locking mechanism is extended when the pressure in the lifting element or cylinder 20 reaches a predetermined level (i.e.—is fully extended). It is also contemplated that a plurality of notches can be provided in the stop bar at various heights along the descent of the subframe 22.

Additional stop bars 92, 94 (see FIGS. 8 and 9) can be utilized as a stop mechanism to limit the lowering of the subframe 22 with respect to the main frame 12. The bars 92, 94 extend longitudinally along the subframe 22 adjacent the stop rails 74, 76. When the subframe is lowered to the desired level, stop bars 92, 94 engage a stop arm 100 fixed to and extending from the bottom of the stop bar 88 attached to the main frame 12, thus preventing further lowering of the subframe 22.

Figure 2:
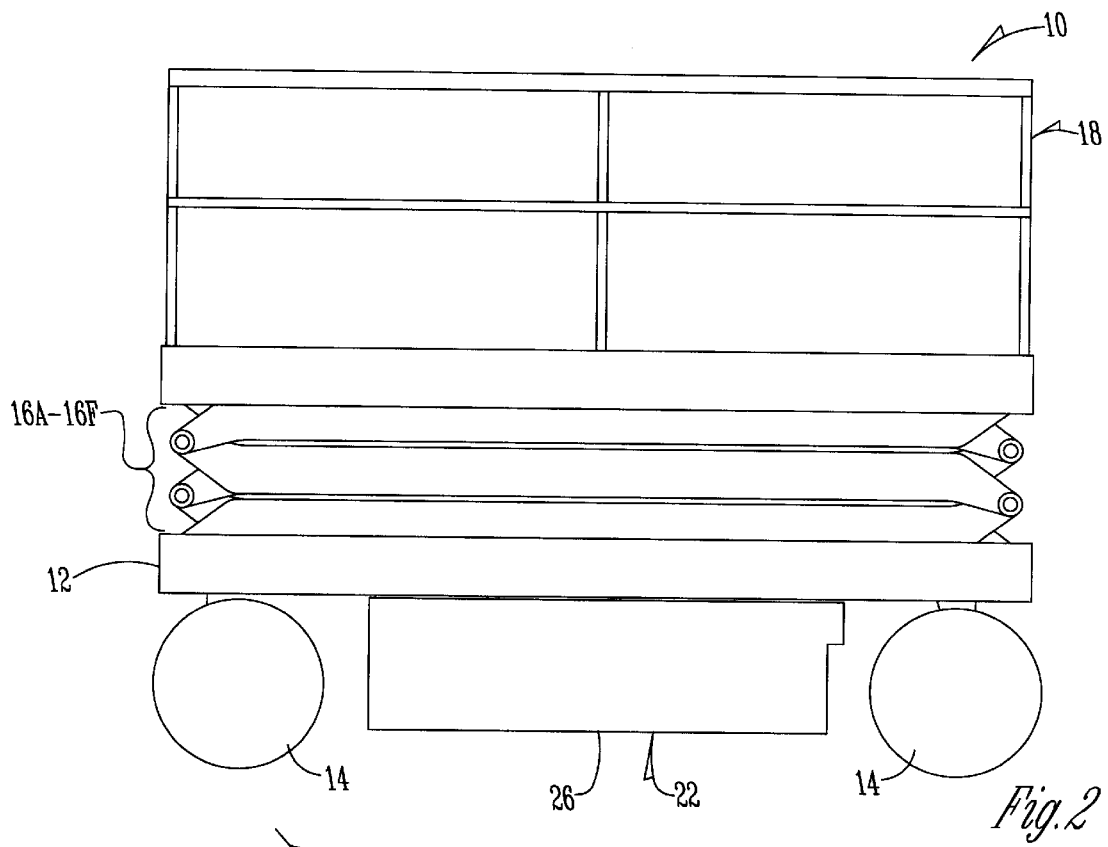
FIG. 2 is a side elevation view of the scissor lift of FIG. 1, but the lift has been lowered and therefore the subframe has been raised.

In operation the present invention works as follows. One drives or transports the self-propelled lifting device 10 to the area where overhead work is to be done. The operator gets on the work platform 18 while the lifting device 10 is in the position shown in FIG. 2. Then one raises the work platform to the desired height by extending the hydraulic cylinder 20. In response, the scissor members 16A–16F extend. This causes the lifting element 20 to pivot counterclockwise to a steeper angle, as shown in FIG. 1. Consequently, the roller wheel 62 on the actuator arm 64 moves upwardly and rearwardly on the lever arm 56. This action decreases the pressure on the pivot arm 48 and allows the subframe 22 to be lowered by gravity, guided by the parallel linkage means 28.

Figure 3:
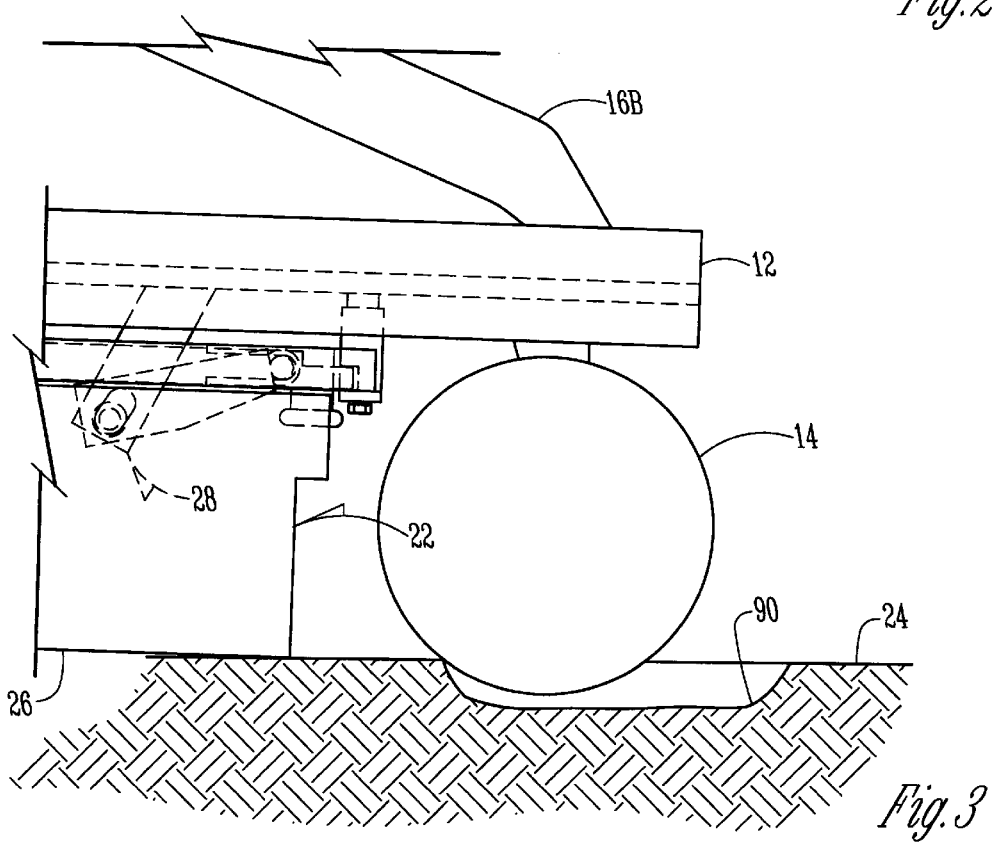
FIG. 3 is an enlarged view of the area 3—3 in FIG. 1. The wheel of the lifting device is shown dropping into a pothole and the lowered subframe contacts the ground to prevent tipping of the lifting device.

In FIG. 3, the lifting device 10 has encountered a pothole 90 while being moved to the right to reach other overhead work. The large bottom wall 26 of the lowered subframe 22 drags on the ground 24, and thus physically discourages the extended lifting device 10 from upsetting. Since the chances of tipping increase when the work platform is raised and decrease when the work platform 18 is lowered, the subframe 22 will also retract in response to the lowering of the work platform 18.

One skilled in the art will appreciate that, although the position of the subframe relative to the main frame 12 is important, the position of the wheels 14 relative to the frame can also be important. For instance, it is contemplated that the wheels could be raised and lowered with respect to the main frame by hydraulic cylinders so as to effectively vary the clearance between a stationary subframe and the ground. In that embodiment, the hydraulic cylinders are responsive to the raising and lowering of the work platform, not necessarily to ground hazards or potholes like conventional hydraulic or pneumatic shock absorbers.

Based upon the foregoing, it is clear that the present invention at least accomplishes its stated objects.

In the drawings and specification there has been set forth a preferred embodiment of the invention, and although specific terms are employed, these are used in a generic and descriptive sense only and not for purposes of limitation. Changes in the form and the proportion of parts, as well as in the substitution of equivalents, are contemplated as circumstances may suggest or render expedient without departing from the spirit or scope of the invention as further defined in the following claims.

What is claimed is:

1. A mechanism for preventing tipping of a lifting device having a main frame supported by a plurality of ground engaging support members and a lifting element raisable and lowerable with respect to the main frame, comprising:

a subframe mounted on the main frame and extending thereunder and intermediately disposed between all of the support members, means for raising and lowering the subframe with respect to the ground in response to the lowering and raising of the lifting element respectively.

2. The mechanism of claim 1 wherein the ground engaging support members are wheels rotatably mounted on the main frame.

3. The mechanism of claim 1 wherein the means for raising and lowering the subframe includes a parallel linkage mounted to the main frame and subframe so that the subframe is held level while being raised and lowered.

4. The mechanism of claim 3 wherein the parallel linkage comprises two pairs of laterally spaced apart parallel brackets, each bracket having one end mounted to the main frame and a free end extending downwardly from the main frame, a first arm having one end pivotally connected to the subframe and another end pivotally connected between the free ends of one of the pairs of brackets, a second arm having opposite ends with one end pivotally connected to the subframe and an intermediate portion pivotally connected between the free ends of the other pair of brackets.

5. The mechanism of claim 4 wherein the brackets are rigidly mounted to the main frame.

6. The mechanism of claim 4 wherein the means for raising and lowering comprises a mechanical lever formed with the second arm of the parallel linkage and an actuator arm rigidly extending from the lifting element for engaging and pivoting the mechanical lever and thereby the second arm.

7. The mechanism of claim 6 wherein a roller wheel is rotatably mounted on the actuator arm for engaging the mechanical lever.

8. The mechanism of claim 6 further comprising a spring operated dampening mechanism operatively interposed between the actuator arm and the mechanical lever.

9. The mechanism of claim 4 further comprising first and second slide blocks mounted on the subframe rearward of the brackets, the first block including a slot therein opening forwardly and adapted to slidingly receive a first pivot shaft connected to the first arm, the second block including a slot therein opening forwardly and adapted to slidingly receive a second pivot shaft connected to the second arm.

10. The mechanism of claim 9 further comprising a locking mechanism comprising first and second stop rails secured for movement with the first and second pivot shafts respectively, each of the stop rails having a leg extending longitudinally from one end and a tab extending transversely from the other end, a stop bar extending downward from the main frame and having at least a pair of notches therein for receiving the legs, whereby, as the subframe approaches a desired position, the pivot shafts and stop rails shift horizontally such that the legs extend into the notches and the tabs extend respectively under a pair of stop arms rigidly mounted to the main frame so as to lock the subframe in place in four locations.

11. The mechanism of claim 1 further comprising a stop mechanism including a stop arm extending from a stop bar mounted on the main frame for limiting downward travel of the subframe by contact therewith.

12. A mechanism for preventing tipping of a lifting device having a main frame supported by a plurality of ground engaging wheels and a lifting element raisable and lowerable with respect to the main frame, comprising:

a subframe mounted under the main frame between each of the wheels, means for raising and lowering the subframe with respect to the main frame in response to the lowering and raising of the lifting element respectively.

13. The lifting device of claim 12 wherein the lifting element is a hydraulic cylinder having one end pivotally connected to the main frame and another end pivotally connected to a scissor member of a scissor lift.

14. The lifting device of claim 12 wherein the subframe is interposed between the wheels horizontally and between the main frame and the ground vertically.

15. A mechanism for preventing tipping of a lifting device having a main frame supported by a plurality of ground engaging support members and a lifting element raisable and lowerable with respect to the main frame, comprising:

a subframe mounted on the main frame and extending thereunder between the support members, means for raising and lowering the subframe with respect to the ground in response to the lowering and raising of the lifting element respectively;

the subframe carrying a tray for holding a battery.

16. The mechanism of claim 15 wherein the tray is swingably mounted to the subframe and has a bottom outer surface thereon for contacting the ground to discourage tipping of the lifting device when a pothole is encountered.

\* \* \* \* \*